United States Patent
Thadani (10) Patent No.: US 6,509,534 B1
(45) Date of Patent: Jan. 21, 2003

(54) PORTABLE SCALE

(76) Inventor: Mohan Thadani, 7291 Waldorf Way, Mississauga, Ontario (CA), L5N 7P7

( * ) Notice: Subject to any disclaimer, the term of this patent is extended or adjusted under 35 U.S.C. 154(b) by 60 days.

(21) Appl. No.: 09/715,003

(22) Filed: Nov. 20, 2000

(51) Int. Cl.⁷ .......................... G01G 21/28; G01G 1/18; G01G 1/20
(52) U.S. Cl. ................ 177/126; 177/127; 177/171; 177/176; 177/206; 177/235; 177/246; 177/252
(58) Field of Search ................ 177/126, 127, 177/171, 172, 173, 174, 175, 176, 206, 235, 246, 247, 248, 249, 250, 251, 252

(56) References Cited

U.S. PATENT DOCUMENTS

| | | | | |
|---|---|---|---|---|
| 205,684 A | | 10/1878 | Rogers | 177/190 |
| 327,152 A | * | 9/1885 | Fitch | 177/127 |
| 379,746 A | * | 3/1888 | Watt | 177/127 |
| 578,220 A | * | 3/1897 | Dixon | 177/172 |
| 634,162 A | | 10/1899 | Bracktle | 177/190 |
| 645,091 A | * | 3/1900 | Harmon | 177/127 |
| 783,329 A | | 2/1905 | Sweet | 177/252 |
| 837,374 A | * | 12/1906 | Aronson | 177/247 |
| 1,639,120 A | * | 8/1927 | Weber | 177/264 |
| 3,082,833 A | | 3/1963 | Myers | 177/180 |
| 3,106,977 A | * | 10/1963 | Wells | 177/246 |
| 3,968,849 A | | 7/1976 | Dale et al. | 177/127 |
| 4,050,531 A | | 9/1977 | Ashbrook | 177/198 |
| 4,347,905 A | * | 9/1982 | Berckes | 177/246 |
| 4,360,072 A | * | 11/1982 | Call | 177/247 |
| 4,744,428 A | | 5/1988 | Knotter et al. | 177/127 |
| 4,836,315 A | * | 6/1989 | Lee | 177/247 |
| 4,961,472 A | * | 10/1990 | Pratt | 177/246 |
| 5,696,355 A | * | 12/1997 | Waltho | 177/126 |
| 5,767,456 A | * | 6/1998 | Hartselle, III | 177/148 |
| 6,268,573 B1 | * | 7/2001 | Hartselle, III | 177/171 |
| 6,284,987 B1 | * | 9/2001 | Al-Modiny | 177/171 |

* cited by examiner

Primary Examiner—Randy W. Gibson
(74) Attorney, Agent, or Firm—Greenblum & Bernstein, P.L.C.

(57) ABSTRACT

A lightweight, portable scale, including a balance beam pivotally positioned on a fulcrum, contained in a tear-drop shaped carrying case. The portable scale has a load pan on one end of the balance beam and a graduated scale, configured to accommodate sliding weight members, extending toward the opposite end of the balance beam. The fulcrum is positioned between the load pan and the graduated scale. To establish equilibrium, the balance beam includes a stationary counter-weight attached on the load pan side of the fulcrum, which balances the empty load pan against the sliding weight members located at a zero position on the graduated scale. The carrying case has a top portion hingedly attached to a bottom portion, which functions as the base of the portable scale and has sidewalls shorter than the fulcrum, preventing interference by the side walls during the weighing process.

20 Claims, 8 Drawing Sheets

PORTABLE SCALE

BACKGROUND OF THE INVENTION

1. Field of the Invention

The present invention relates to the field of lightweight, pocket-sized or portable scales and improvements thereto.

2. Description of Related Art

Portable balance beam scales with integrated carrying cases are well known in the art. A typical scale includes a fulcrum projecting from a base, which may double as the bottom half of the carrying case, as disclosed, for example, by U.S. Pat. No. 4,744,428 to KNOTTER et al. and U.S. Pat. No. 3,968,849 to DALE et al. The typical scale also includes a balance beam positioned across the fulcrum, with a substance holder or a load pan on one end and a graduated scale on the other end. The pan and the graduated scale are disposed on opposite sides of the fulcrum, so that a slidable weight (or weights) can be moved along the balance beam in order to balance the substance in the pan. When the load pan and the slidable weight are in equilibrium (i.e., the balance beam is balanced in a horizontal position), the weight of the substance in the load pan is equal to the number (or numbers) on the graduated scale next to which the slidable weights are positioned.

The prior art also includes a type of scale that incorporates a balance beam with a load pan on one side of a fulcrum and a weight pan on the other side of the fulcrum, as disclosed, for example, by U.S. Pat. No. 4,050,531 to ASHBROOK. In a portable scale having this design, a substance to be weighed is placed in the load pan and balancing weights of known mass are placed in the weight pan, until the pans are in equilibrium (i.e., the beam is horizontally balanced) across the fulcrum. The weight of the substance is then determined to be equal to the sum of the balancing weights.

To be effective, a portable scale must be balanced whenever the sliding weight is set in the zero position. Achieving an appropriate balance is problematic for a portable scale because the load pan must be as lightweight as possible to keep the overall weight of the scale at a minimum. Therefore, a measuring weight positioned on the balance beam opposite the load pan must be light weight as well, or the scale will not be in equilibrium when the load pan is empty and the measuring weight is in the zero position. However, the measuring weight must be heavy enough to accurately weigh substances up to several grams or ounces in order to have practical use.

One attempt to address the zero position balancing problem in the prior art was to place the bulk of the measuring weight in a vertical plane of the fulcrum whenever the measuring weight is in a zero position, as in KNOTTER et al. The positioning prevents the measuring weight from factoring into the balancing of the empty load pan. However, to position the measuring weight in the scale's fulcrum requires a convoluted design of the measuring weight housing because, while the bulk of the weight is positioned in a plane of the fulcrum, an indicator of the weight must be adjacent to the zero position on the sliding scale. The additional material and the unorthodox design for the measuring weight housing increase manufacturing costs.

Another disadvantage common to the prior art is that the typical carrying case, being integrated with the scale operation (i.e., serving as the base of the scale), may undesirably interfere with the weighing process. For example, in KNOTTER et al., the carrying case has a bottom portion (i.e., the base) with relatively high sides in relation to the height of the fulcrum. Also, because the carrying case is designed to be compact, it defines an extremely close fit around the outer parameter of the load pan of the scales and around the end of the balance beam. The high sides combined with the close fit result in portions of the scale rubbing against the sides of the case during the weighting process, creating an inaccurate measurement. Furthermore, the high sides of the case interfere with the user attempting to place materials into the load pan or attempting to slide the movable weights along the balance beam. The interference with the user further enhances the chances of inaccurate measurement and increases the possibility of inadvertently spilling the contents of the load pan.

Also with respect to the carrying cases, the prior art includes cases that are substantially rectangular in shape, which has a number of drawbacks. For example, the scales are intended to be portable and inexpensive, so the more compact the carrying case the better. However, a substantially rectangular carrying case creates wasted, void spaces at the corner regions of the case corresponding to the more narrow portions of the enclosed scale. In particular, the carrying case must be wide enough to accommodate the load pan, which is much wider than the balance beam. Therefore, the portion of the carrying case housing only the balance beam region of the scale is significantly wider than the beam itself, resulting in unnecessary dimensional bulk to the case. Furthermore, the additional size of the case requires additional material and increased manufacturing costs, which are passed on to the customers.

SUMMARY OF THE INVENTION

The present invention is directed to a lightweight, portable scale and integrated carrying case, which addresses the problems existing in the prior art, discussed above.

An aspect of the present invention provides a portable scale that includes a fulcrum and a balance beam. The balance beam is pivotally mountable on the fulcrum and supports a load pan on one end and has a graduated scale extending from a zero position toward an opposite end of the balance beam. The fulcrum is positioned between the load pan and the zero position of the graduated scale. The portable scale further includes a dynamic weight and a stationary weight. The dynamic weight is movable along the balance beam from the zero position to the opposite end of the balance beam. The stationary weight is connected to the balance beam such that the fulcrum is positioned between the stationary weight and the dynamic weight.

The dynamic weight can include a fitting member, which has a channel configured to attach to the balance beam. The fitting member is thereby slidable along a guide channel of the balance beam. There is also a metal insert disposed within the fitting member such that the metal insert is centered on a central vertical axis of the fitting member. The stationary weight and the dynamic weight are removable and replaceable, which enables variations in a measurement range of the portable scale.

In another embodiment of the present invention, the portable scale includes a base, a pair of fulcrum posts projecting form the base, and a balance beam pivotally supported by the pair of fulcrum posts. The balance beam includes a load pan support member on one end and a graduated scale extending from a zero position toward an opposite end. The fulcrum posts are positioned between the load pan support member and the zero position of the graduated scale. The portable scale further includes a load pan that is pivotally supported by the load pan support member.

The portable scale also includes a dynamic weight member, movably mounted on the balance beam for movement along the graduated scale, and a stationary counter-weight. The stationary counter-weight balances against the dynamic weight when the dynamic weight is located at the zero position of the graduated scale. The dynamic weight can include a fitting member, which has a channel configured to attach to the balance beam. The fitting member is thereby slidable along a guide channel of the balance beam. There is also a metal insert disposed within the fitting member such that the metal insert is centered on a central vertical axis of the fitting member. No portion of the fitting member is located within a plane defined by the pair of fulcrum posts when the fitting member is positioned at the zero position of the graduated scale. The portable scale also includes a calibration weight, movable along a bottom side of the balance beam.

One aspect of the invention includes a carrying case. The carrying case has a top portion and a bottom portion, such that the top portion is closable onto the bottom portion. The bottom portion of the carrying case serves as the base of the portable scale. Also, the bottom portion of the carrying case has sides that are shorter than the pair of fulcrum posts projecting from the base. The top portion can be hingedly connected to the bottom portion of the carrying case.

In another aspect of the present invention, the portable scale includes a carrying case, having a tear-drop shape, and scale components. The carrying case includes a top portion and a bottom portion, such that the top portion is closable onto the bottom portion. The scale components include a fulcrum member projecting from the bottom portion of the carrying case and a balance beam pivotally supported by the fulcrum member. The balance beam supports a load pan on one end and a weight measuring device on an opposite end. The fulcrum is positioned between the load pan and the weight measuring device. The weight measuring device includes a dynamic weight member, which is movably mounted on the balance beam, and a graduated scale, which extends from a zero position of the balance beam toward an end of the balance beam opposite from the load pan. The dynamic weight member is slidably positioned on the graduated scale to balance against a substance contained in the load pan.

The load pan is positioned within an enlarged end of the tear-drop shaped carrying case and the balance beam is positioned within a narrowing end of the tear-drop shaped carrying case to provide efficient, economical storage of the scale components. The top portion of the carrying case is hingedly connected to the bottom portion. Also, the bottom portion of the carrying case has sides that are shorter than the pair of fulcrum posts projecting from the base.

The portable scale can also include a stationary counter-weight attached to the balance beam. The stationary counter-weight is located such that the fulcrum member is positioned between the stationary counter-weight and the weight measuring device. The stationary counter-weight balances against the dynamic weight member when the dynamic weight member is located at the zero position of the graduated scale.

Another aspect of the present invention provides a portable scale that includes a carrying case having a tear-drop shape and scale components. The carrying case includes a top portion and a bottom portion, such that the top portion is closable onto the bottom portion. The scale components include a pair of fulcrum posts projecting from the bottom portion of the carrying case and a balance beam pivotally supported by the pair of fulcrum posts. The balance beam includes a load pan support member on one end and a graduated scale extending from a zero position toward an opposite end. The pair of fulcrum posts is positioned between the load pan support member and the zero position of the graduated scale. The scale components further include a load pan pivotally supported by the said load pan support member and a dynamic weight member movably mounted on the balance beam for movement along the graduated scale.

The load pan is positioned within an enlarged end of the tear-drop shaped carrying case and the balance beam is positioned with a narrowing end of the tear-drop shaped carrying case to provide efficient, economical storage of the scale components. The top portion of the carrying case can be hingedly connected to the bottom portion. Also, the bottom portion of the carrying case has sides that are shorter than the pair of fulcrum posts projecting from the base.

The scale components also include a stationary counter-weight removably attached to the load pan support member. The stationary counter-weight balances against the dynamic weight member when the dynamic weight member is located at the zero position of the graduated scale. The scale components also include a calibration weight, movable along a bottom side of the balance beam.

DETAILED DESCRIPTION OF THE INVENTION

The present invention is a lightweight, portable scale (i.e., pocket-sized scale) contained in an integrated carrying case. An object of the invention is to provide a scale that is compact, inexpensive and easy to use, yet cable of providing accurate and reliable weight measurements. Another object of the invention is to provide a low-cost, durable carrying case small enough to fit conveniently into a pants or coat pocket, a handbag, an automobile glove compartment or similar convenient location. Also, the carrying case does not interfere with the weighing process.

Figure 1A:
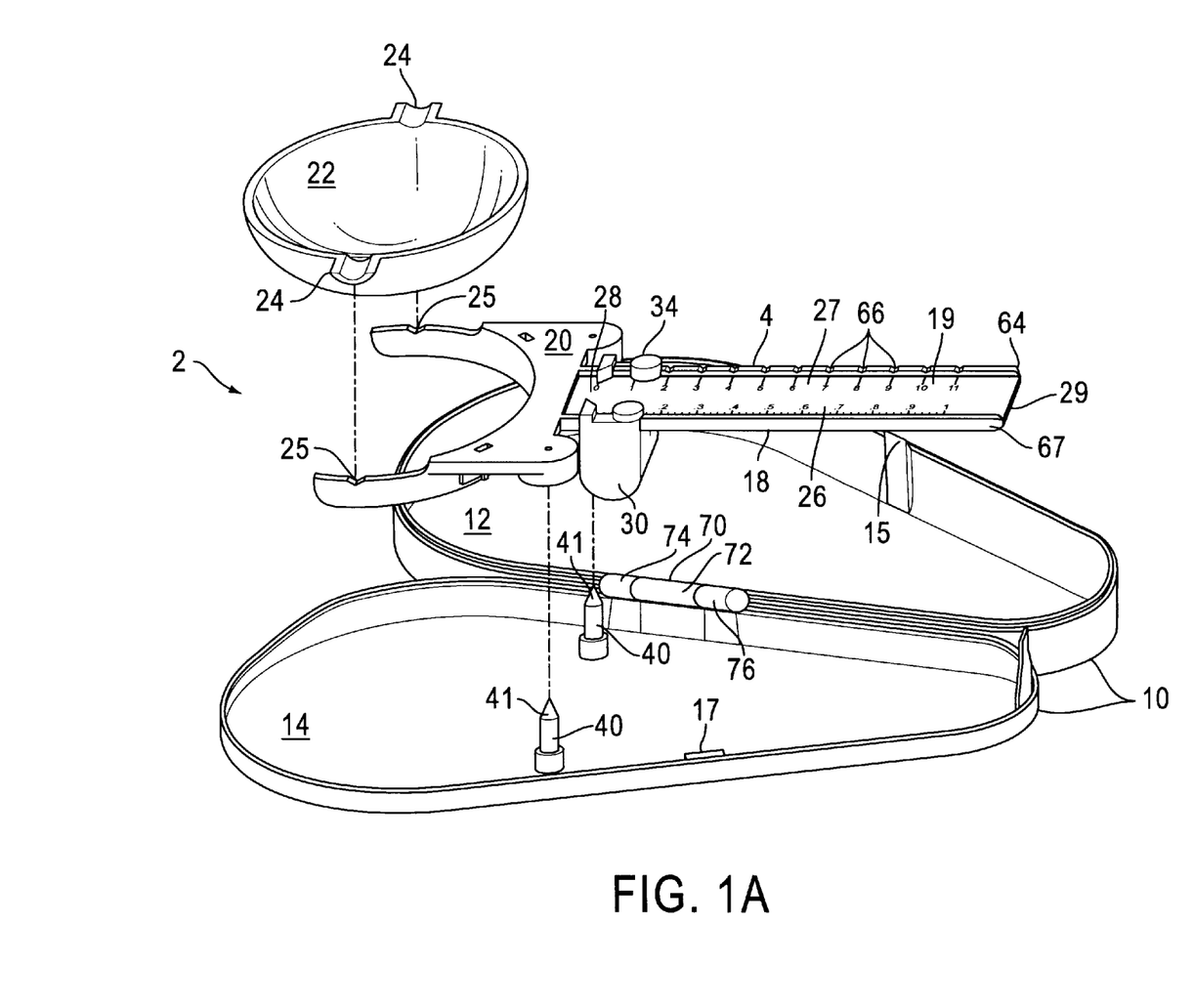
FIG. 1A is an exploded, top perspective view of the scale and an open carrying case, according to one embodiment of the present invention.
Figure 1B:
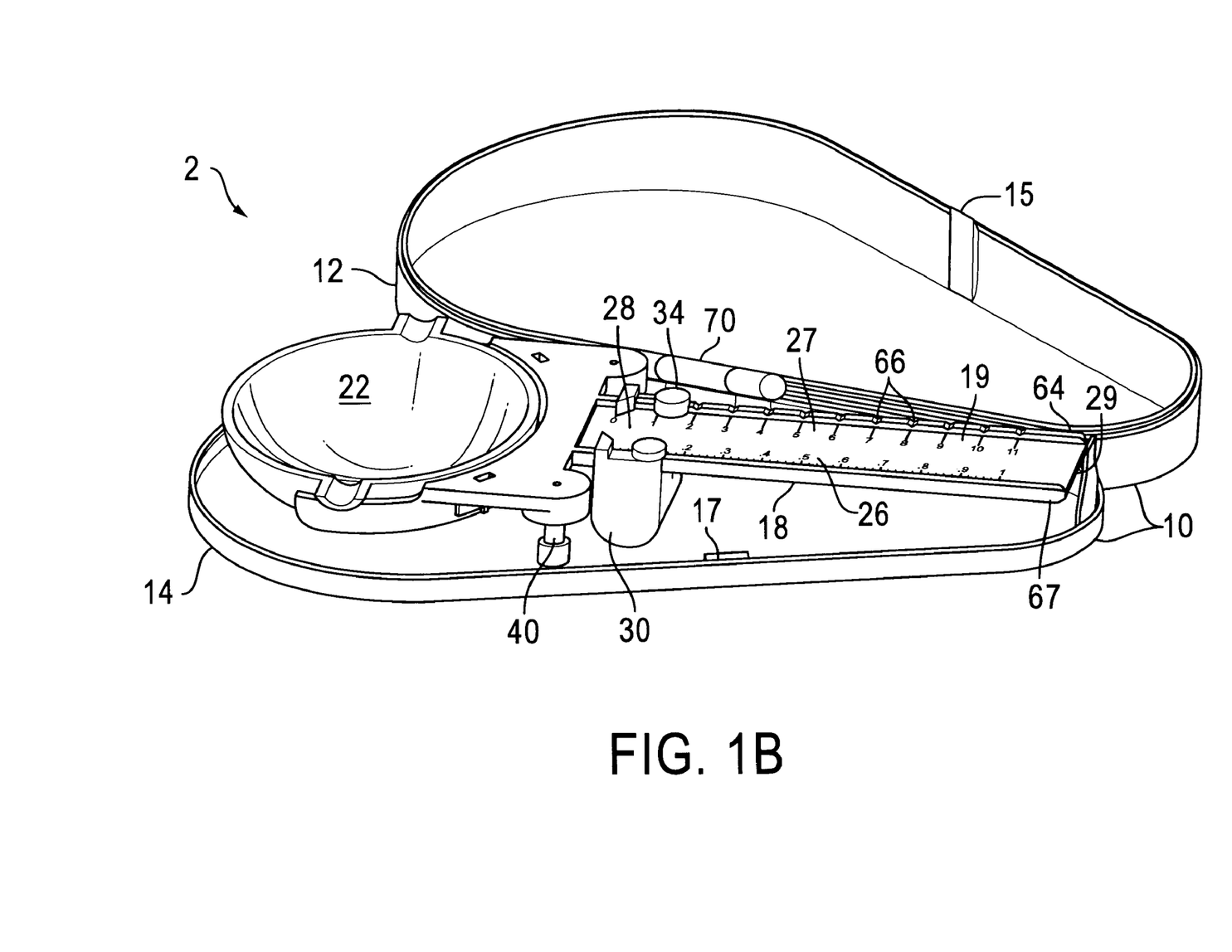
FIG. 1B is a top perspective view of the scale of FIG. 1A, assembled and positioned in the open carrying case.

FIGS. 1A and 1B depict one embodiment of the invention, which satisfies the above criteria. The integrated scale and carrying case combination 2 includes a balancing beam scale 4 assembled on a carrying case 10, as shown in FIG. 1B.

Generally, to measure the weight of a substance, the user places the substance into a load pan 22 and balances the scale 4 using dynamic weight members 30 and 34, which are positioned on a balance beam 18 on the opposite side of fulcrum posts 40 from the load pan 22. The measurement increases as the dynamic weight members 30 and 34 are moved progressively from a zero position 28 of the graduated scale 19 toward the opposite end 29 of the balance beam 18. When the scale 4 is in equilibrium, i.e., the dynamic weight members 30 and 34 are positioned such that the balance beam 18 is horizontal, the weight of the substance is equal to the measurement units (e.g., grams or ounces) on the graduated scale 19 adjacent to which the dynamic weight members 30 and 34 are positioned.

Figure 2:
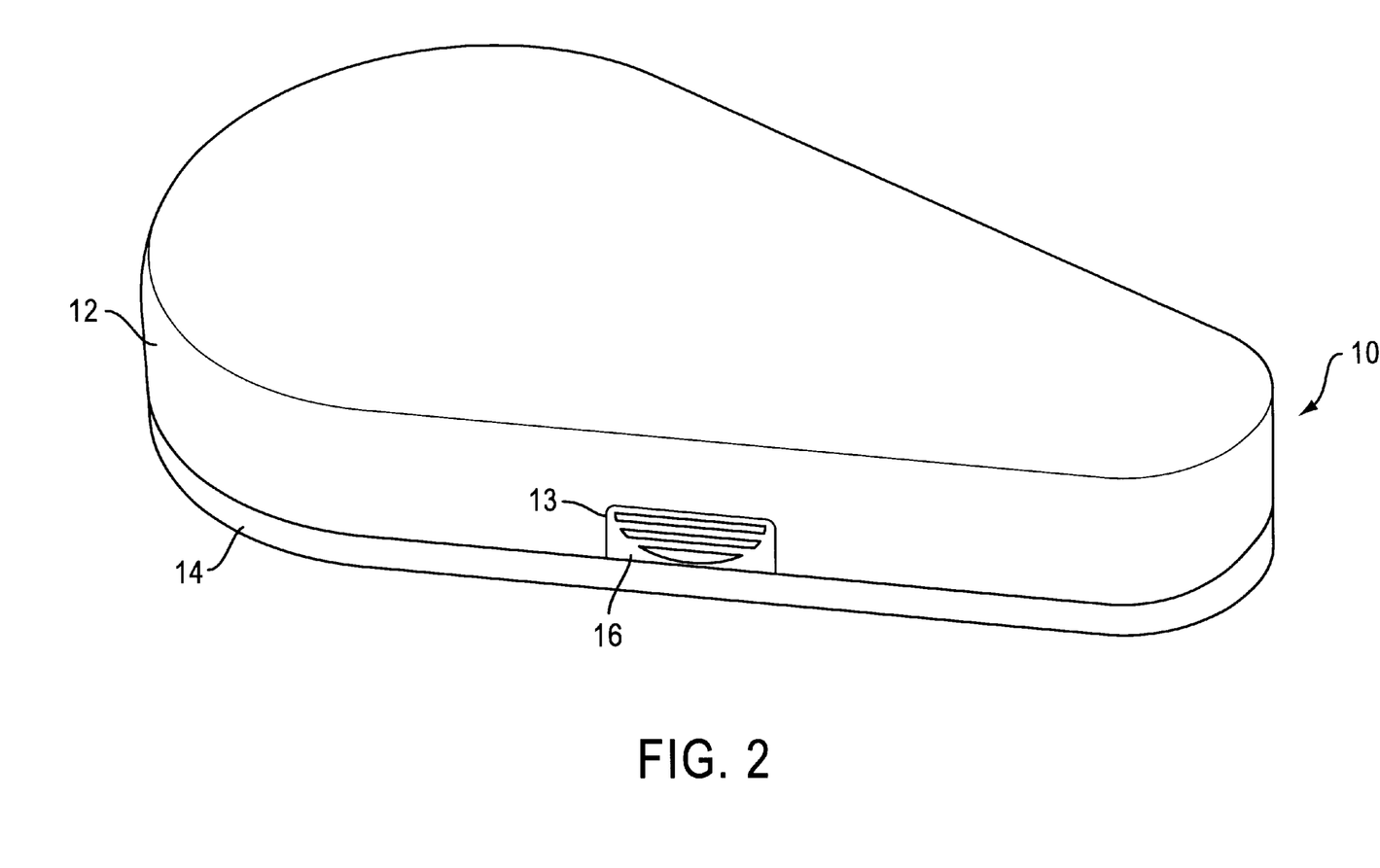
FIG. 2 is a perspective view of the carrying case of the embodiment of FIG. 1A in the closed position.

The scale 4 is contained in the carrying case 10, which is made of any suitable material, for example, a plastic or other lightweight, durable polymeric material. FIG. 2 depicts a tear-drop shaped carrying case, according to one embodiment of the invention, in the closed position. The tear-drop shape minimizes the size of the carrying case 10 because the case closely conforms to the physical dimensions of the scale 4. In other words, the wide end of the case 10 corresponds to the circular load pan 22 and the narrow end of the case 10 corresponds to the narrow, extended balance beam 18. Further, the case 10 is narrow in height, being slightly higher than the load pan 22 and the balance beam 18, when the scale 4 is assembled and positioned on the fulcrum posts 40.

The close fit of the case 10 around the scale 4 secures the scale 4 in position on the fulcrum posts 40 when the case 10 is in the closed position, preventing the scale 4 from moving freely inside the closed case 10. The assembled scale 4 therefore is not disrupted during transport, enabling immediate use of the scale 4 upon opening of the case 10. Furthermore, the tear-drop shape, which closely conforms to the shape of the scale 4, reduces the unused or void interior portions of the case 10. The shape therefore reduces the overall physical dimensions of the case 10 and minimizes the amount of material necessary for manufacturing the case 10, thereby providing a more easily transportable scale and reducing costs.

In comparison, a rectangular-shaped case, having the same depth as the tear-drop shaped case, necessarily requires a larger surface area to house a scale of the same dimensions as scale 4. The larger size of the rectangular-shaped case hinders the effective portability of the scale and requires additional material at additional cost to the consumer. The empty, interior comer regions, defined by the rectangular-shaped case, which correspond to the narrow balance beam 18 portion of the scale 4, are wasted space. Also, the rectangular-shaped case defines substantially angular corners that are more likely to catch on inner material of a coat or pants pocket, or become blocked by other objects in the same storage compartment, thereby interfering with efficient access to the scale and carrying case combination 2.

In an embodiment of the invention, the carrying case 10 includes a top portion 12 and a bottom portion 14, which are joined by a hinge 70, shown in FIG. 1A. The hinge 70 assures accurate alignment of the top portion 12 and the bottom portion 14 when the case 10 in the closed position. Also, the hinge prevents separation of the top portion 12 from the bottom portion 14, so that the top portion 12 is not misplaced while the scale is in use. The hinge 70 is formed unitarily and in one piece from the top portion 12 and the bottom portion 14, respectively, of the carrying case 10, so that the hinge 70 is not a separate attachment. Because hinge 70 is not a separate attachment, the manufacturing and assembly processes are simplified, and therefore at lower cost. Also, the finished product is generally more durable, since the adequacy of the attachment and potential failure of the attachment means (e.g., screws, rivets, interlocking tabs) is not a concern.

In one embodiment, the hinge 70 includes a generally cylindrical lower protrusion 72 extending from the approximate center of one elongated sidewall of the bottom portion 14. The lower protrusion 72 has male connecting members (not pictured) extending from each end along its longitudinal axis. When the cylindrical protrusion 72 is disposed between complementary upper protrusions 74 and 76, which extend from the top portion 12, the male connecting members are integrally inserted into female receptacles (not pictured), located on opposing inside surfaces of the receptacle protrusions 74 and 76. When assembled, the hinge 70 pivots on the longitudinal axis of lower protrusion 72 to open and close the carrying case 10. Other embodiments include the protrusion 72 being on the top portion 12 and the protrusions 74 and 76 being on bottom portion of carrying case 10. Also, any integrated type of hinge can be incorporated in the case 10. For example, in an alternative embodiment, the hinge pivots around a connecting wire disposed through an axial hole, running the length of the longitudinal axis of hinge 70, whenever the lower protrusion 72 is joined in alignment with upper protrusions 74 and 76.

The carrying case 10 further includes a latching mechanism 13 on the sidewalls opposite the hinge 70, shown in FIG. 2. As with the hinge 70, the latching mechanism 13 is formed unitarily and in one piece from the top portion 12 and the bottom portion 14, respectively, of the carrying case 10, so that the latching mechanism 13 is not a separate attachment. In an embodiment of the invention, the latching mechanism 13 includes a latch ramp 17 protruding from the inner side of the bottom portion 14. The latch ramp 17 aligns with and engages an interior latch 15 on the top portion 12 when the case 10 is in a closed position. The interlocking connection between the latch ramp 17 and the interior latch 15 mechanically secures the top portion 12 and the bottom portion 14, preventing inadvertent opening of the case 10 during transport, and possible loss of the scale 4 or any of the scale's removable parts (e.g., the load pan 22 and the dynamic weights 30 and 36).

To unlatch the case 10, the recessed region 16, located on the exterior of the top portion 12 in cooperation with the interior latch 15, is depressed. The recessed region 16 is depicted in FIG. 2. Depressing recessed region 16 disengages the interior latch 15 of the top portion 12 from the latch ramp 17 of the bottom portion 14.

In an alternative embodiment, the hinge 70 could be replaced with a second latching mechanism 13. In this embodiment, the top portion 12 would be removable from the bottom portion 14, but the carrying case 10 would not differ in other respects.

The bottom portion 14 of the carrying case 10 functions as the base of the scale 4, as shown in FIG. 1B. The pair of fulcrum posts 40 are mounted on the inner side of the bottom portion 14, protruding upwardly to engage a load pan support member 20 at pivot points 42. In an embodiment of the invention, the bottom portion 14 is shallow in comparison to the upper portion 12, i.e., the sidewalls of the bottom portion 14 are shorter than the corresponding sidewalls of the upper portion 12. In any case, the sidewalls of the bottom portion 14 are shorter than the protruding fulcrum posts 40, as shown by the cut-away portion of sidewall 6 in FIG. 6. The shorter sidewalls assure that the bottom portion 14 does not interfere with the weighing process, either by physically contacting any portion of the scale 4 or by obstructing access by the user.

Figure 3:
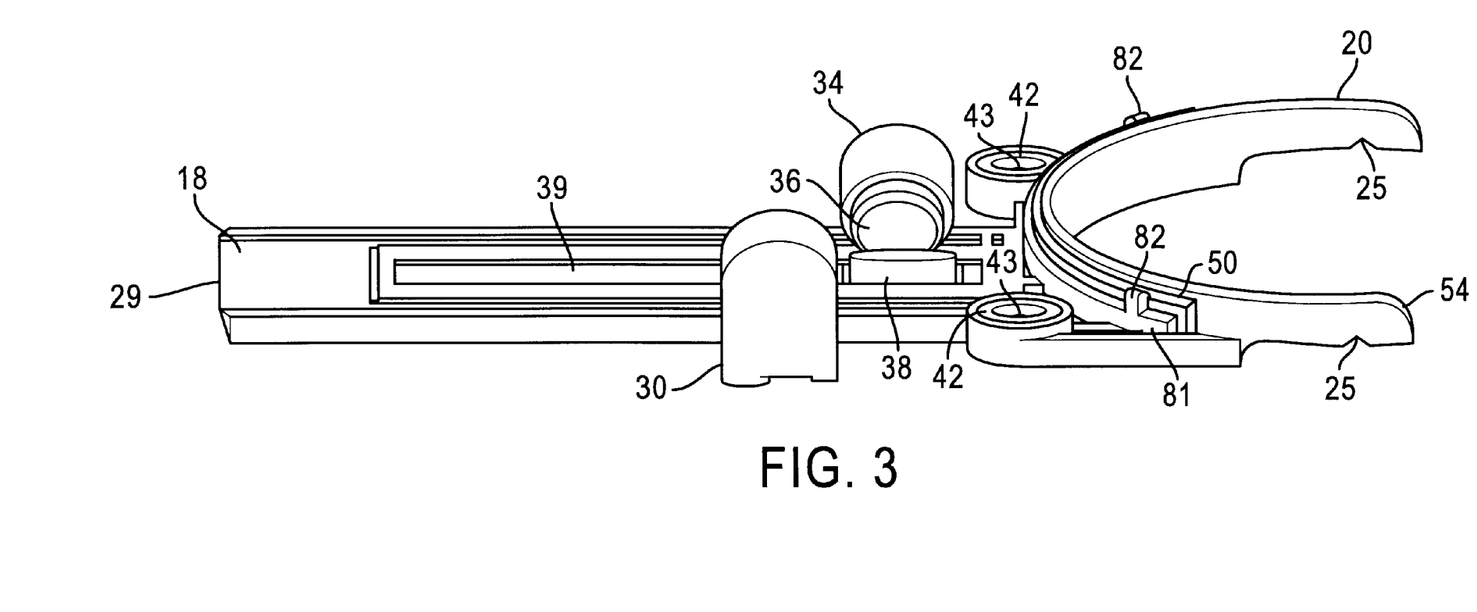
FIG. 3 is a bottom perspective view of the balance beam, without the carrying case, according to the embodiment of FIG. 1A.

In an embodiment of the invention, the fulcrum posts 40 are metallic, to enhance reliability and durability, although the fulcrum posts 40 can be made from any material, such as a rigid polymeric material, capable of inflexibly supporting the combined weight of the assembled balance beam 18, the load pan 22 and the substance being weighed. The fulcrum posts 40 may include conical tips 41, shown in FIG. 1A, which define points centered at the top of the vertical axis of each fulcrum post 40. In an embodiment, the conical tips 41 cooperate with recessed metallic inserts 43, located at the pivot points 42 on the load pan support member 20, as shown in FIG. 3. When the scale 4 is assembled, the center of each metallic insert 43 positionally corresponds to the apex of the conical tip 41 of the respective fulcrum post 40. The integration of the metallic inserts 43 and the conical tips 41 minimizes the contact area between the fulcrum posts 40 and the load pan support member 20, increasing freedom of movement of the balance beam 18. Also, because the conical tips 41 are accommodated in the recessed metallic inserts 43, the scale 4 is less likely to shift inadvertently from the center of the fulcrum posts 40 during the weighing process.

Referring to FIGS. 1A and 1B, the balancing portion of the scale 4 includes the balance beam 18, having at one end the load pan support member 20. Included on the upper surface of the balance beam 18 is a graduated scale 19, which begins at a zero position 28, on the end of the balance beam 18 closest to the load pan support member 20, and extends toward the opposite end 29 of the balance beam 18. The graduated scale 19 has incremental demarcations for whole units of measurement on a coarse weight side 27 and demarcations for fractional units of measurement on a fine weight side 26 of the graduated scale 19. The units increase incrementally from zero on both the coarse weight side 27 and the fine weight side 26 as the graduated scale 19 extends toward the opposite end 29 of the balance beam 18. In an embodiment of the invention, the coarse weight side 27 provides one gram increments, from 0 grams at the zero position 28 to 11 grams closest to the opposite end 29. The fine weight side 26 is divided into one tenth of a gram increments, from 0 grams at the zero position to 1.0 grams. The scale 4 is therefore capable of weighing materials up to 12.0 grams in this embodiment of the invention.

The balancing process is performed by depositing the substance to be weighed into the load pan 22, which is supported by the load pan support member 20, discussed below. The user then slides the dynamic weight members 30 and 34 along the flanged outer edges 64 and 67 of the balance beam 18, until the scale 4 reaches equilibrium (i.e., the balance beam 18 is balanced across the fulcrum posts 40 in a horizontal position). The measured weight of the substance can then be read from the graduated scale 19. In particular, the measured weight is the sum of the numbers on the fine weight side 26 and the coarse weight side 27, adjacent to which the dynamic weight members 30 and 34 are positioned, respectively.

Figure 4:
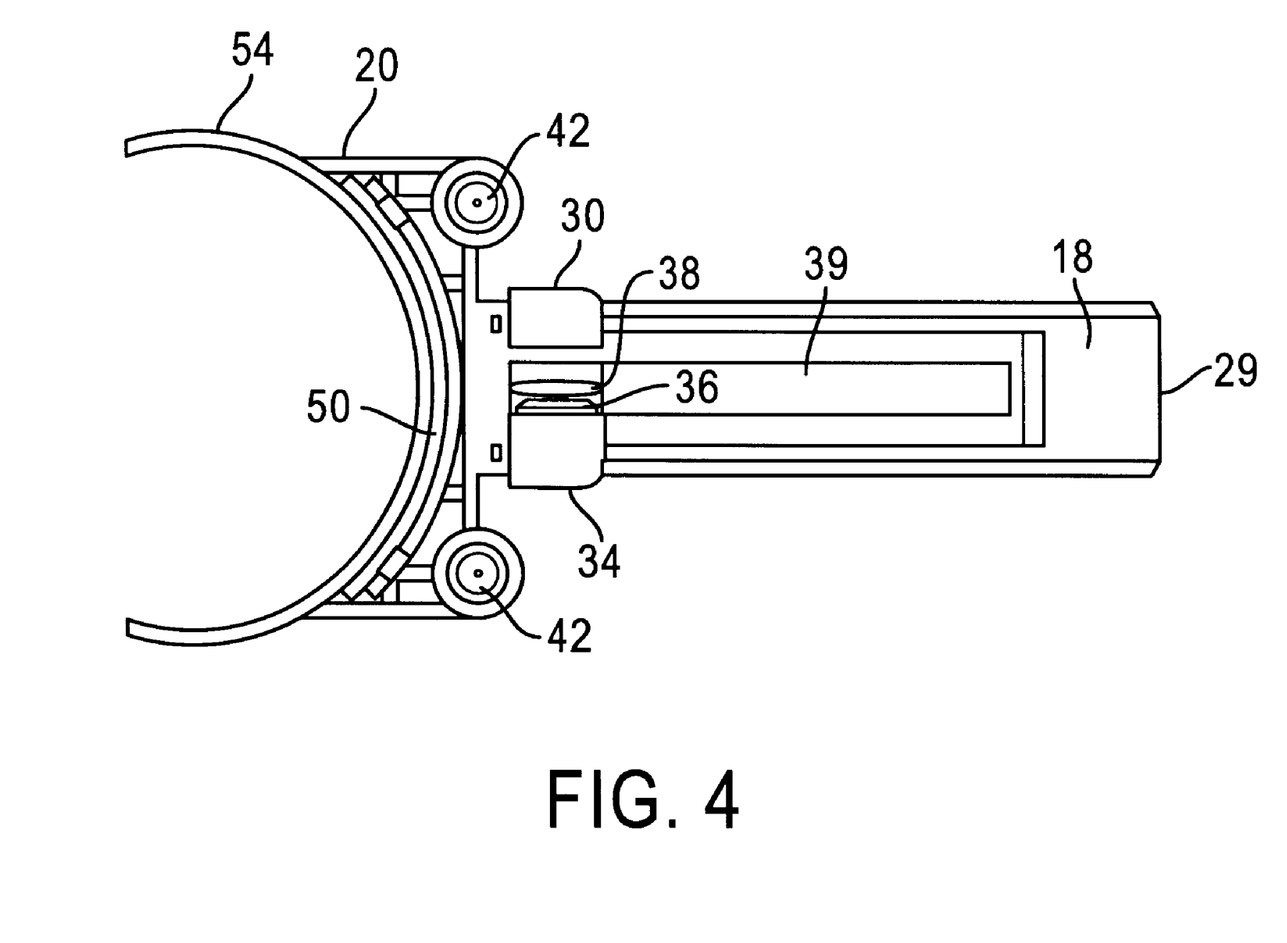
FIG. 4 is a bottom plan view of the balance beam, without the carrying case, according to the embodiment of FIG. 1A.

The dynamic weight member 34 is the coarse weight member (i.e., the heavier of the two dynamic weight members). Referring to FIG. 4, the dynamic weight member 34 is shown from below the balance beam 18, positioned in its zero position. The dynamic weight member 34 is slightly larger than the fine dynamic weight member 30, and contains a metallic insert 36, discussed below. The dynamic weight members 34 and 30 are substantially aligned when in their respective zero positions, as shown in FIG. 4.

Figure 5:
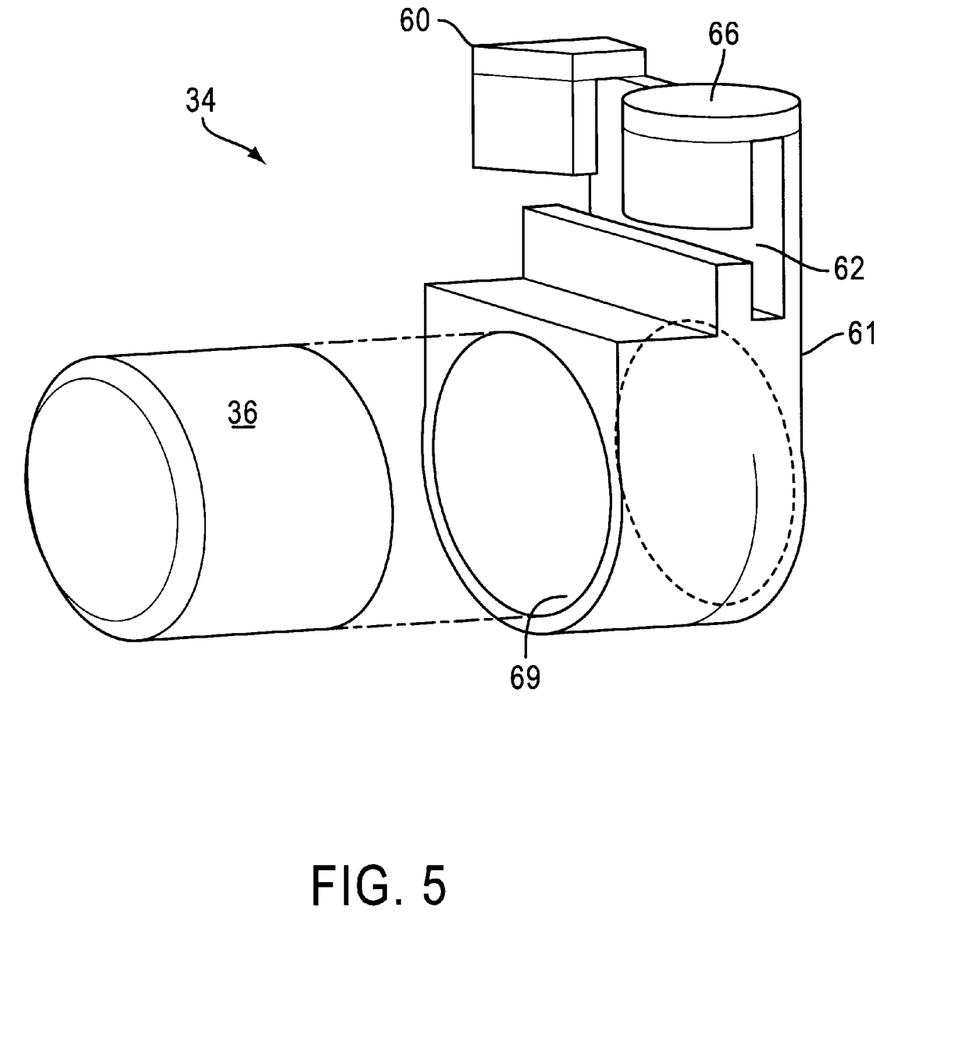
FIG. 5 is an enlarged perspective view of a movable weight member, according to an aspect of the invention.

Referring to FIG. 5, the dynamic weight member 34 includes a fitting member 61, which defines a channel 62. The channel 62 corresponds to the channel guide or flange 64, formed along the length of the coarse weight side 27 of the balance beam 18. The fitting member 61 also includes structural features that aid the accurate positioning of the measuring process. In one embodiment, the fitting member 61 includes a pointer 60, configured so that the apex of the pointer 60 aligns with a unit number on the coarse weight side 27 of the graduated scale 19 whenever the fitting member 61 is positioned in a notch 66, described below, adjacent to the unit number. The alignment of the pointer 60 with the desired unit number, together with positioning in the corresponding notch 66, redundantly assures that the dynamic weight member 34 is in proper position on the balance beam 18. The fitting member 61 also includes a circular thumb pad 66. The thumb pad 66 is a slight extension of the fitting member 61, providing the user a more secure grip while sliding the coarse dynamic weight member 34 along the balance beam 18.

Referring to FIG. 1A, the flange 64 contains a series of notches 66, each of which is positioned directly adjacent to one of the coarse weight measurement units, i.e., 0 to 11 grams. During the weighing process, the coarse dynamic weight 34 is moved along the coarse weight side 27 of the balance beam 18, from notch to notch, until a coarse weight measurement is obtained. Each notch 66 secures the coarse dynamic weight member 34 in place and in proper alignment with the measurement positions associated with the particular notch 66, enhancing the reliability of the scale 4. In other words, when the coarse dynamic weight member 34 is positioned in a notch 66, the user is assured that there is no misalignment, thus preventing inadvertent skewing of the weighing process. The coarse dynamic weight member 34 is secured in a notch 66 by a notch tab (not shown) projecting from below the pointer 60 of the fitting member 61 into the upper region of the channel 62.

The fitting member 61 also defines a cavity 69 into which a metallic weight insert 36 can be placed. The insert adds sufficient mass to the coarse dynamic weight 34 to accommodate the one gram increments on the graduated scale 19. In one embodiment of the invention, the insert 36 weights 1.0 to 5.0 grams, for example. Alternative embodiments of the invention include a heavier coarse (and fine) dynamic weight insert 36, depending on the measurement range of the scale 4. The mass of the metallic insert 36 is inversely proportional to the length of the balance beam 18. For example, when the balance beam 18 is relatively long and the increments of the graduated scale 19 are spaced further apart, the metallic weight insert 36 has less mass.

Figure 6:
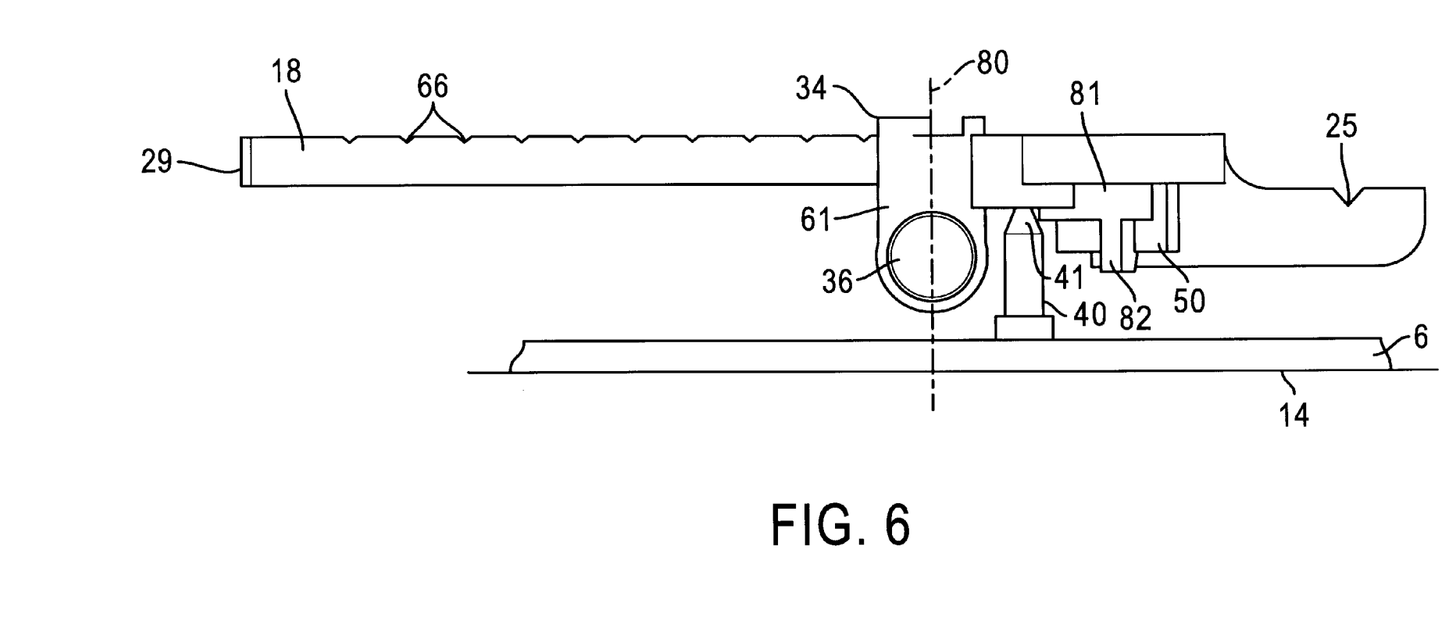
FIG. 6 is an enlarged side sectional view of the invention, depicting the movable weight member in relation to a fulcrum post, according to an aspect of the invention.

In an embodiment of the invention, the cavity 69 is circular and has a center point substantially aligned with the central vertical axis of the fitting member 61, as shown, for example, by dashed line 80 in FIG. 6. This aligned configuration allows the fitting member 61 to be dimensionally smaller than if the cavity 69 were substantially offset to either the left or the right of the center line of fitting member 61. Therefore, the fitting member 61 is more simple to design and manufacture, as well as incorporates less material, thereby reducing manufacturing costs. Alternative embodiments of the invention include any geometric shape of the cavity 69 (with a corresponding shape of insert 36) and a center point of the cavity 69 that is not perfectly aligned with the central vertical axis of fitting member 61.

The fine dynamic weight member 30 is positioned on the fine weight side 26 of the graduated scale 19. In one embodiment, the fine dynamic weight member 30 includes a fitting member that is identical in appearance to the fitting member 61, shown in FIG. 5, although dimensionally smaller, depending on calibration parameters of scale 4. The fine dynamic weight member 30 does not include a metallic insert, although it does include a cavity 69 in the fitting member 61 to accommodate a metallic insert if calibration parameters require the additional weight. Rather, the weight of the fitting member 61 is sufficient to provide accurate balance measurements. Alternative embodiments may include a metallic weight insert, depending on the calibration requirements for the scale 4.

The channel 62 of the fitting member 61 of the fine dynamic weight member 30 is positioned on flange 67. During the weighing process, the pointer 60 is slidably positioned to align with a fractional unit number on the fine weight side 26 of the graduated scale 19. However, unlike flange 64, the flange 67 is smooth (i.e., contains no notches 66), as shown in FIGS. 1A and 1B. The fitting member 61 is thus able to slide uninhibited between the zero position 28 and the end of the fine weight side 26 of the graduated scale 19, enabling the user to gently nudge the fine dynamic weight member 30 along the scale 19 to efficiently perform delicate fractional measurements.

The balance beam 18 of the scale 4 also provides for a dynamic calibration tab 38. Referring to FIGS. 3 and 4, the calibration tab 38 is slidably positioned in a slot 39 on the underside of the balance beam 18. The calibration tab 38 is set to properly calibrate the scale 4 prior to a weighing operation. The user places the dynamic weight members 30 and 34 at the zero position 28 when the load pan 22 is empty. If the scale 4 is not perfectly balanced, the user adjusts the calibration tab 38 along the slot 39 until the appropriate balance is achieved. In particular, if the scale 4 is lower on the load pan 22 side of the fulcrum posts 40, the calibration tab 38 is adjusted toward the opposite end 29 of the balance beam 18, until the scale 4 is in equilibrium. If the scale 4 is higher on the load pan 22 side of the fulcrum posts 40, the calibration tab 38 is adjusted toward the zero position 28 of the balance beam 18. Adjustment of the calibration tab 38 increases the accuracy of the subsequent measurement once the substance is placed into the load pan 22.

The calibration tab 38 is positioned on the underside of the balance beam 18 to prevent inadvertent contact with the calibration tab 38 during the weighing operation, necessitating re-calibration of the scale 4. The calibration tab 38 can be made of any appropriate material, depending on weight requirements (e.g., plastic, metal). When in a zero position, the calibration tab 38 is substantially in alignment with the dynamic weight members 30 and 34 in their respective zero positions, as shown in FIG. 4.

Located at one end of the balance beam 18 is the load pan support member 20, which supports the load pan 22, as shown in FIGS. 1A and 1B. The load pan support member 20 and the load pan 22 are located on the opposite side of the fulcrum posts 40 from the graduated scale 19. In an embodiment of the invention, the load pan 22 is concave (i.e., bowl-shaped) and substantially circular. The concave, circular shape causes the substance being weighed to shift toward the center the load pan 22, automatically centering the load. The load pan 22 is therefore able to contain for weighing various types of substances, including liquids and granular materials, with a reduced risk of spilling. The load pan 22 is made from any durable lightweight material, such as plastic. It is preferable that the material also be waterproof, so that measurement of substances in liquid form can be performed. As discussed above, the load pan support member 20 includes the pivot points 42, which correspond to the fulcrum posts 40. The pivot points 42 include, in an embodiment, recessed metal inserts 43 that communicate with the pointed tips 41 of the fulcrum posts 40.

Figure 7:
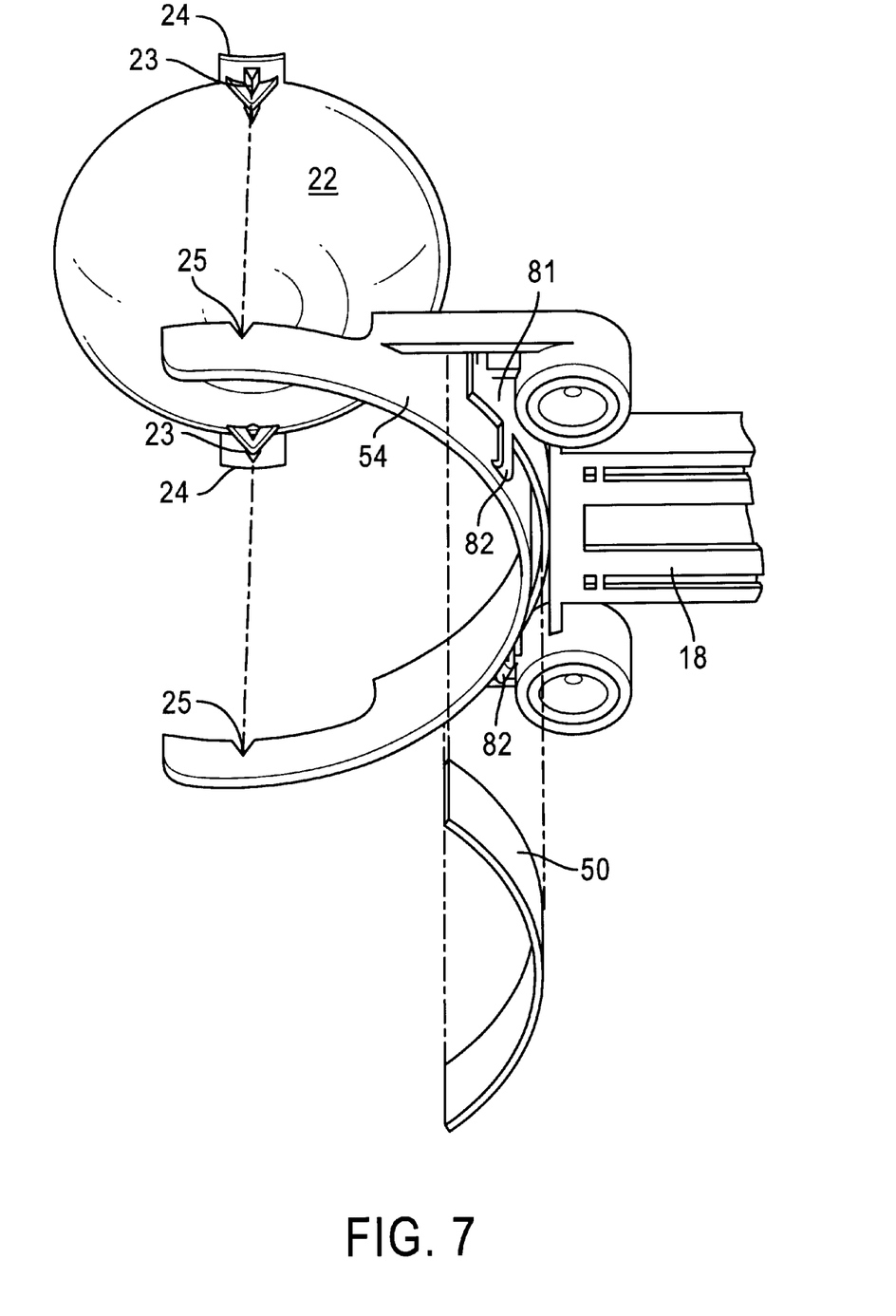
FIG. 7 is an exploded, bottom perspective view of a load pan and a removable stationary counter-weight member, according to an aspect of the invention.

The load pan support member has a generally u-shaped yoke 54, with the open portion of the yoke 54 facing away from the balance beam 18, as shown in FIGS. 1A and 3. The yoke 54 includes a generally v-shaped notch 25 on each arm of the yoke and diametrically opposed to one another. Referring to FIG. 7, the notches 25 receive corresponding generally v-shaped tabs 23 projecting from below supports 24, which are attached to opposite sides of the load pan 22. The cooperation of the v-shaped tabs 23 of supports 24 with the v-shaped notches 25 assures proper placement of the load pan 22 onto the yolk 54, while also permitting the load pan 22 to pivot about an imaginary line connecting the opposing notches 25. The pivoting motion allows the load pan 22 to remain substantially horizontal as the scale 4 pivots about the fulcrum posts 40, even when a relatively heavy substance to be weighed is placed into the load pan 22, causing the scale to tip significantly toward the load pan 22 side of the fulcrum posts 40. By pivoting toward a horizontal orientation, the load pan 22 maintains a position that helps to prevent its contents from spilling over the sides, even where the contents are in liquid form.

Referring to FIG. 3, the load pan support member 20 also includes a stationary counter-weight 50, mechanically attached to the underside of the load pan support member 20. As shown in FIG. 4, the counter-weight 50 fits concentrically around a portion of the outer edge of the yoke 54. The counter-weight 50 is fastened in place by a concentric outer lip 81, in conjunction with a pair of brackets 82 extending from the outer lip 81. The outer lip 81 secures the counter-weight 50 in place by pressing it against the outer edge of the u-shaped yoke 54. The pair of brackets 82 adjoin a bottom portion of the counter-weight 50, preventing it from sliding in a downward direction (i.e., toward the bottom portion 14 of the carry case 10 when the scale 4 is assembled). The counter-weight 50 is therefore held securely in place, so that it does not shift during movement of the scale 4, disrupting the weighing process. However, the counter-weight 50 can be removed from outer lip 81, as indicated in FIG. 7, by simply prying the brackets 82 in a direction away from the counter-weight 50. The counter-weight 50 can therefore be removed and replaced with one having a different weight, as discussed below.

In an embodiment of the invention, the stationary counter-weight 50 is made of a suitable metal, although any relatively dense material can be used. The stationary counter-weight 50 is weighted so that the scale 4 is in equilibrium whenever the dynamic weights 30 and 34 are at the zero position 28 on the graduated scale 19 (taking into account slight variances correctable by calibration, using the calibration tab 38).

Incorporation of the stationary counter-weight 50 enables the configuration of the fitting member 61, described above. In particular, referring to FIG. 6, the fitting member 61 is configured such that the cavity 69 and the corresponding insertable metallic insert 36 are substantially aligned with the central vertical axis of the fitting member 61, as indicated by dashed line 80. Therefore, the metallic insert 36 is positioned substantially outside the plane of the fulcrum posts 40 whenever the coarse dynamic weight member 34 is in the zero position 28. (Embodiments in which the fine dynamic weight member 30 contains a metallic insert likewise have the metallic insert substantially outside the plane of the fulcrum when in the zero position 28.) Therefore, the stationary counter-weight 50 is attached to the load pan support beam 20 to balance the opposing weight. An advantage of attaching a separate stationary counter-weight 50 is that the size and weight of the load pan 22 need not be adjusted to counter-balance the dynamic weights members 30 and 34.

In an alternative embodiment of the invention, the weight of counter-weight 50 can be increased to counter-balance heavier dynamic weight members 30 and 34. The scale 4 can therefore be easily adapted to measure substances within a range of heavier weights by simply adding heavier weight members 30 and 34 (e.g., adding heavier metallic inserts), in combination with a heavier counter-weight 50, without having to change any other structural elements of the scale and carrying case combination 2, including the load pan 22, the balance beam 18 and the carrying case 10. (It may be necessary, however, to change the graduated scale 19 for clarity.) The manufacturer therefore is able to produce an adaptable scale having the capability of performing various measurements without incurring considerable retooling expenses. Also, in an alternative embodiment, the user is able to adapt the scale to measure heavier (or lighter) weights by changing the dynamic weight members 30 and 34 and the stationary counter-weight 50 after purchasing the original scale and carrying case combination 2. For example, the dynamic weight members 30 and 34, which provide weight measurement within a pre-identified range (e.g., 0 to 12 grams or 0 to 120 grams), together with an associated stationary counter-weight 50, can be available in matched sets corresponding to the desired weight range.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed:

1. A portable scale, comprising:
   a fulcrum;
   a balance beam, pivotally mountable on said fulcrum; said balance beam supporting a load pan on one end and comprising a graduated scale extending from a zero position toward an opposite end of said balance beam, wherein said fulcrum is positioned between said load pan and the zero position of the graduated scale;
   a dynamic weight, movable along said balance beam from the zero position to the opposite end of said balance beam;
   a stationary weight, connected to said balance beam, wherein said fulcrum is positioned between said stationary weight and said dynamic weight; and
   a calibration weight, movable along said balance beam to calibrate the scale prior to a weighing operation.

2. The portable scale according to claim 1, wherein said dynamic weight comprises:
   a fitting member having a channel configured to attach to said balance beam, said fitting member being slidable along a guide channel of said balance beam; and
   a metal insert disposed within said fitting member and centered on a central vertical axis of said fitting member.

3. The portable scale according to claim 2, wherein said stationary weight and said dynamic weight are removable and replaceable, enabling variations in a measurement range of the portable scale.

4. A portable scale, comprising:
   a base;
   a pair of fulcrum posts projecting from said base;
   a balance beam pivotally supported by said pair of fulcrum posts, said balance beam comprising a load pan support member on one end and a graduated scale extending from a zero position toward an opposite end, said pair of fulcrum posts being positioned between said load pan support member and the zero position of the graduated scale;
   a load pan pivotally supported by said load pan support member;
   a dynamic weight member movably mounted on said balance beam for movement along the graduated scale; and
   a stationary counter-weight attached to said load pan support member;
   wherein said stationary counter-weight balances against said dynamic weight when said dynamic weight is located at the zero position of the graduated scale.

5. The portable scale according to claim 4, further comprising a carrying case, said carrying case comprising a top portion and a bottom portion, said top portion being closable onto said bottom portion and wherein said bottom portion comprises said base of the portable scale.

6. The portable scale according to claim 5, wherein said top portion is hingedly connected to said bottom portion.

7. The portable scale according to claim 5, wherein said bottom portion of said carrying case comprises sides that are shorter than said pair of fulcrum posts.

8. The portable scale according to claim 4, wherein said dynamic weight member comprises:
   a fitting member having a channel configured to attach to said balance beam, said fitting member being slidable along a guide channel of said balance beam; and
   a metal insert disposed within said fitting member and centered on a central vertical axis of said fitting member.

9. The portable scale according to claim 8, wherein no portion of the fitting member is located within a plane defined by said pair of fulcrum posts when said fitting member is positioned at the zero position of the graduated scale.

10. The portable scale according to claim 4, further comprising a calibration weight, movable along a bottom side of said balance beam.

11. A portable scale, comprising:
    a carrying case having a tear-drop shape, said carrying case comprising a top portion and a bottom portion, said top portion being closable onto said bottom portion;
    a plurality of fulcrum members projecting from said bottom portion of said carrying case; and
    a balance beam pivotally supported by said fulcrum members, said balance beam supporting a load pan on one end and a weight measuring device on an opposite end, wherein said fulcrum members are positioned between said load pan and said weight measuring device;
    wherein said load pan is positioned within an enlarged end of said tear-drop shaped carrying case and said balance beam is positioned within a narrowing end of said tear-drop shaped carrying case to provide efficient, economical storage of said scale components.

12. The portable scale according to claim 11, wherein said top portion is hingedly connected to said bottom portion.

13. The portable scale according to claim 11, wherein said bottom portion of said carrying case comprises sides that are shorter than said fulcrum members.

14. The portable scale according to claim 11, wherein said weight measuring device comprises:
   a dynamic weight member movably mounted on said balance beam; and
   a graduated scale, extending from a zero position of said balance beam toward an end of said balance beam opposite from said load pan;
   wherein said dynamic weight member is slidably positioned on said graduated scale to balance against a substance contained in said load pan.

15. The portable scale according to claim 14, further comprising a stationary counter-weight attached to said balance beam;
   wherein said fulcrum members are positioned between said stationary counter-weight and said weight measuring device; and
   wherein said stationary counter-weight balances against said dynamic weight member when said dynamic weight member is located at the zero position of the graduated scale.

16. A portable scale, comprising:
   a carrying case having a tear-drop shape, said carrying case comprising a top portion and a bottom portion, said top portion being closable onto said bottom portion; and
   scale components comprising:
      a pair of fulcrum posts projecting from said bottom portion of said carrying case;
      a balance beam pivotally supported by said pair of fulcrum posts, said balance beam comprising a load pan support member on one end and a graduated scale extending from a zero position toward an opposite end, said pair of fulcrum posts being positioned between said load pan support member and the zero position of the graduated scale;
      a load pan pivotally supported by said load pan support member; and
      a dynamic weight member movably mounted on said balance beam for movement along the graduated scale;
   wherein said load pan is positioned within an enlarged end of said tear-drop shaped carrying case and said balance beam is positioned within a narrowing end of said tear-drop shaped carrying case to provide efficient, economical storage of said scale components.

17. The portable scale according to claim 16, wherein said top portion is hingedly connected to said bottom portion.

18. The portable scale according to claim 16, wherein said bottom portion of said carrying case comprises sides that are shorter than said pair of fulcrum posts.

19. The portable scale according to claim 16, further comprising a stationary counter-weight removably attached to said load pan support member; wherein said stationary counter-weight balances against said dynamic weight when said dynamic weight is located at the zero position of the graduated scale.

20. The portable scale according to claim 16, further comprising a calibration weight, movable along a bottom side of balance beam.

* * * * *